United States Patent

[11] 3,601,349

[72] Inventor James E. Murphy, Jr.
Flossmoor, Ill.
[21] Appl. No. 832,644
[22] Filed June 12, 1969
[45] Patented Aug. 24, 1971
[73] Assignee Thrall Car Manufacturing Company
Chicago Heights, Ill.

[54] TIEDOWN LUG
6 Claims, 7 Drawing Figs.
[52] U.S. Cl. ................................................. 248/361,
105/369 A
[51] Int. Cl. ..................................................... B65j 1/22
[50] Field of Search ........................................... 248/361;
105/369 A, 368 T, 366.2, 366.4, 366.6, 366.8

[56] References Cited
UNITED STATES PATENTS
2,742,874 4/1956 Patterson ..................... 248/361 X
3,187,686 6/1965 Podesta ....................... 248/361 X
3,312,182 4/1967 Broling ........................ 248/361 X
3,315,617 4/1967 Schwiebert ................... 105/368 X
3,324,807 6/1967 Broling ........................ 105/369

Primary Examiner—Chancellor E. Harris
Attorney—Merriam, Marshall, Shapiro & Klose ABSTRACT: Disclosed is a tiedown device for use in tying a load in place on a truck or railroad car. The tiedown device has an elongated plate with a series of indentations in each side edge, a lug body slidably mounted on the plate topside and having a shoulder portion and a pair of arms downwardly and inwardly depending from the shoulder portion and terminating in nose portions adapted to contact the underside of the plate upon upward displacement of the lug body, an upwardly extending tooth on at least one of the arms adapted to extend into an indentation in the plate when the nose portions contact the underside of the plate, and means on the lug body for attaching a tiedown strap or line.

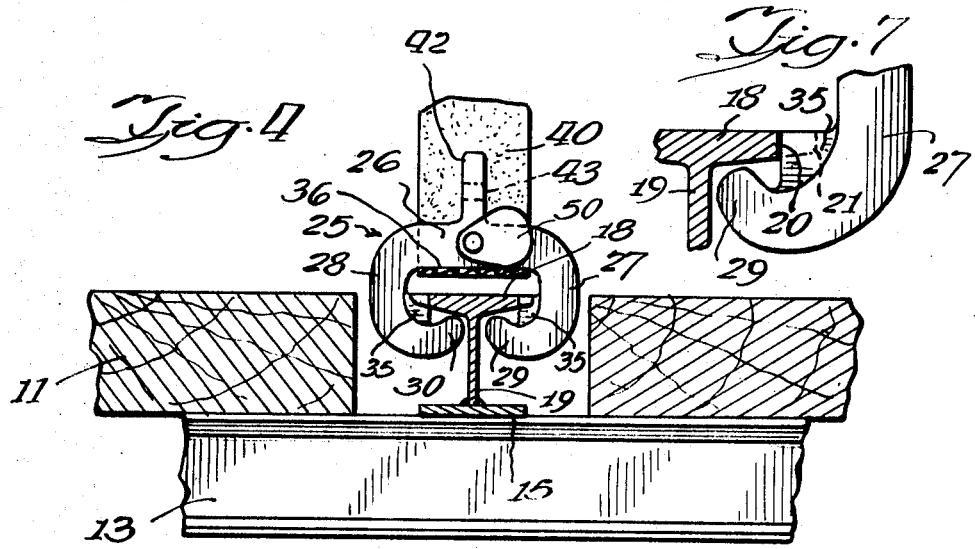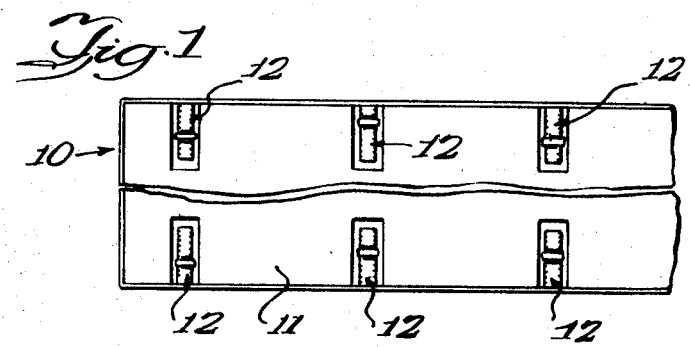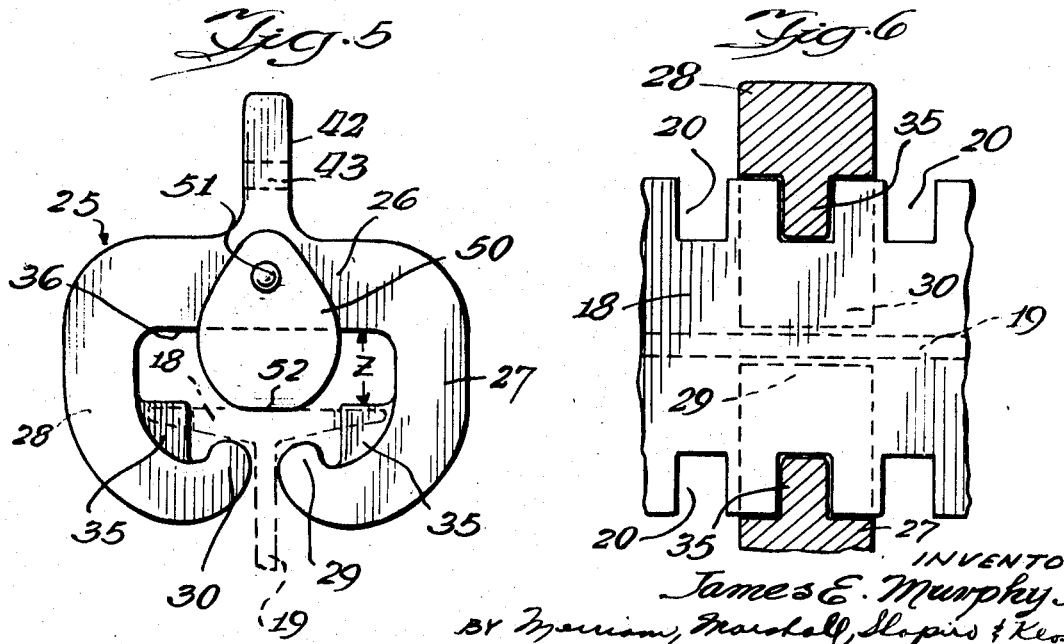

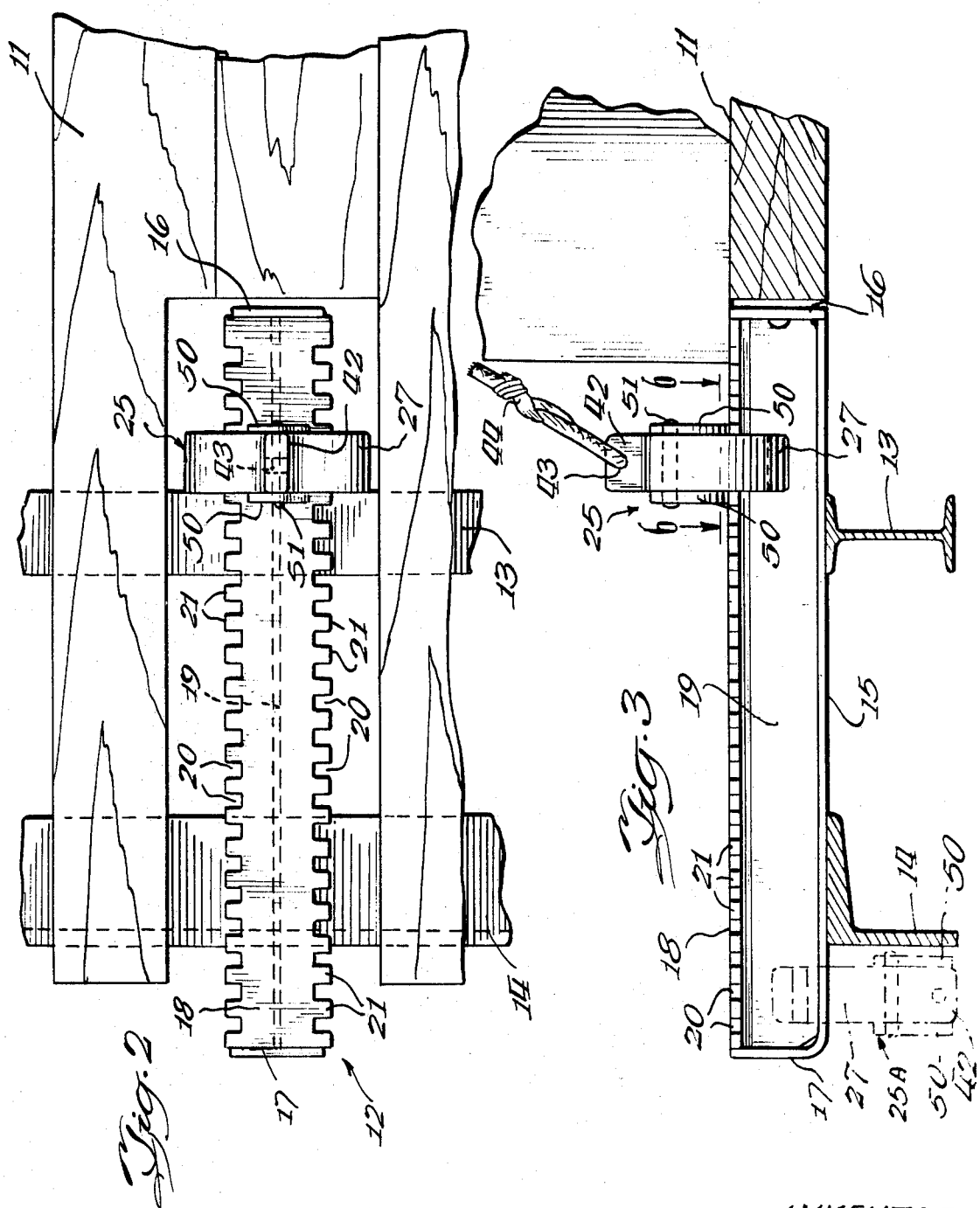

TIEDOWN LUG

This invention relates to devices used to secure loads on freight vehicles. More particularly, this invention is concerned with a novel tiedown lug which can be secured to the floor or other part of a freight vehicle to securely tiedown a load.

In the transportation of freight by railroad, truck, airplane, and ship, it is necessary that the load be prevented from shifting and moving to prevent damage to the load itself as well as to the vehicle used for its transportation. In addition, shifting of a freight load must be prevented in order that it not block openings such as doors and to prevent the load from being lost or from moving out of control with the inherent danger this would cause.

While there are a number of freight load tiedown devices presently on the market, they all have some shortcomings. Many tiedown devices are unduly complex and require an undesirable amount of servicing. Others are costly to manufacture. Still others, while suitable for some types of loads, lack flexibility and adaptability which would render them suitable for efficiently tying down securely loads of various sizes and dimensions. There is thus needed a tiedown device which is rugged, of relatively low cost, and flexible in positioning so that it can be adapted to secure loads of various sizes. Such a tiedown device is provided by this invention.

The tiedown device of this invention comprises, in part, an elongated rigid fixedly secured plate having a series of indentations in each side edge of the plate on which a lug body is slidably mounted. The lug body has a shoulder portion from which a pair of arms depend downwardly. The arms terminate in nose portions adapted to contact the underside of the plate upon upward displacement of the lug body. At least one of the arms has an upwardly extending stub or tooth which is adapted to extend into one of the indentations in the side edge of the plate. When the tooth is so positioned, the lug body is restrained against movement along the plate. The lug body also carries suitable means for attaching a tiedown strap or line to it. When tension is applied to such a tiedown strap or line, the nose portions of the arms are brought into contact with the underside of the plate. The plate must be firmly secured to resist such forces.

The invention will now be described further in conjunction with the attached drawings in which:

FIG. 1 is a partial plan view of the floor of a freight vehicle and shows a plurality of tiedown devices of this invention in the floor;

FIG. 2 is a plan view of an embodiment of a tiedown structure of this invention mounted in the floor of a freight vehicle;

FIG. 3 is a side elevational view, partly in section, further showing the tiedown device of FIG. 2 mounted in the floor of a freight vehicle;

FIG. 4 is a front elevational view of the tiedown device of FIGS. 2 and 3;

FIG. 5 is an enlarged view of the lug body of the tiedown device of FIG. 4;

FIG. 6 is a sectional view taken along the line 6—6 of FIG. 3; and

FIG. 7 is an enlarged view showing the lower part of one of the arms of the tiedown lug body in relationship to the plate with which it cooperates.

So far as is practical, the same or similar elements which appear in the different figures of the drawings will be identified by the same number. Furthermore, although the following description will have particular reference to the use of the tiedown device in a railroad freight car, it should be understood that the device is equally suitable for use in trucks, airplanes, and ships, as well as on other vehicles or in other places where it is desirable to securely fasten a load to a floor, wall or similar structure.

With reference to FIG. 1, the railroad freight car 10 has a floor 11 in which a plurality of tiedown devices 12 of this invention are integrally built into the floor, thus providing a smooth loading surface. The tiedown devices 12 are shown positioned on the longitudinal sides of floor 11 in spaced apart arrangement. Advisably, a pair of such tiedown devices is placed on opposite side of the floor so that a suitable tiedown strap or line can be run from one to the other to secure a freight load against movement during transportation.

As shown more clearly in FIGS. 2 and 3, the railroad freight car bottom 11 is supported in part by an I-beam stringer 13 and by channel member side sill 14. Each longitudinal side of the floor has similar supporting structure, plus of course the center beam of the car as normally used in railroad freight cars. The floor 11 is shown constructed of wooden planks although it can be made of any material suitable for the purpose. Lower flange 15, having inner metal end 16 and outer metal end 17, is mounted on the floor-supporting structure comprising stringer 13 and side sill 14. Elongated plate 18 is joined at each of its ends to the upper ends of vertically positioned plates 16 and 17. In addition, plate 18 is supported by, and joined to, vertical web 19 which is joined at its lower edge to plate 15. As shown more clearly in FIG. 4, the horizontal plate 18 and web 19 can be integrally formed from a structural metal T. The metal T can be produced by cutting through the middle of the web of an I-beam having the appropriate dimensions.

A series of indentations 20 is provided in each longitudinal side edge of plate 18. The indentations can be suitably formed by means of a press brake by punching out blanks from along the edge. The indentations can be about 9/16 inch wide and the teeth 21 remaining about one-half inch wide. Each side edge of plate 18 thus takes on the appearance or structure of a simple gear rack having a succession of lugs or teeth 21 equally spaced therein.

Slidably mounted on plate 18 is a lug body 25 having a shoulder portion 26, as shown more clearly in FIGS. 4, 5 and 7, and a pair of arms 27 and 28 which downwardly and inwardly depend from the shoulder portion 26 and end in rounded nose portions 29 and 30 which are adapted to contact the underside of plate 18. Lug body 25 can be made of any suitable material although it is preferred to make it of cast iron.

Nose portions 29 and 30 of the arms terminate at a distance sufficiently spaced apart from each other to leave a gap for vertical web 19 to pass therebetween. This gap, however, is minimal because it is advisable for the nose portions 19 and 20 to contact the underside or bottom of plate 18 close to its juncture with web 19 to minimize the torque which would be applied by means of a line or strap joined to the lug body 25 and pulled at an angle off to one side. However, the remaining portion of the arms is spaced away from the plate edges and underside of the plate.

At least one of the arms 27 and 28 is provided with a tooth or stub 35 which will fit into the indentations or gaps 20 provided in plate 18 to thereby restrain movement of the lug body 25 along plate 18. Although one such tooth or stub 35 is adequate, it is advisable that each of the arms 27 and 28 have such a tooth 35 for engagement with a gap or indentation 20 on its respective side of plate 18. Each tooth advisably has opposing flat parallel sides and a front face which joins the arm below the top of the nose portion, as shown in FIGS. 5 and 6. Also, the sides of the tooth advisably intersect the inner side of the arm in arcuate lines as shown in FIG. 5.

With reference to FIG. 5, the distance Z from the lower edge of shoulder portion 26 to the upper edge of tooth or stub 35 is at least slightly greater than the thickness of plate 18 so that, when the lower surface 36 of the shoulder portion 26 rests on the topside of plate 18, it is possible to slide the lug body 25 longitudinally along plate 18 without having its movement obstructed. When positioned in such sliding arrangement, the top surface of the teeth or stubs 35 are located below the bottom side of plate 18 with sufficient clearance to avoid becoming engaged with indentations 20.

As shown in FIG. 6, arms 27 and 28 are considerably thicker than the width of indentations 20 and are thereby prevented from slipping through the indentations and thereby being removed from plate 18. This prevents loss or stealing of the lug body from the remainder of the tiedown device.

Although the teeth 35 are shown centrally located on the inner arcuate side of arms 27 and 28 (FIG. 6), they can be placed offcenter or to one side if advisable.

As shown in FIG. 4, the lower surface 36 of the shoulder portion 26 of the lug body 35 is substantially straight and thereby provides a surface adapted for contact with a weblike belt 40 which can be strung underneath thereof and back again for suitably tying it to the lug body. The surface 36 is furthermore made substantially cylindrical to provide a smooth surface over which belt 40 can slide.

An alternative tying means, and the preferred one, is shown in FIGS. 3 and 5 in which the lug body 25 is provided with an upper stem 42 with a hole therein 43 for receiving a line 44 for tying down a freight load.

Since the weight of lug body 25 will cause it to drop downwardly after a lifting force is removed thereon and the stubs or teeth 35 thereby disengaged from indentations 20 it is advisable, although not an essential part of the invention, to provide a locking means which is capable of holding the lug body in temporarily fixed position with the teeth 35 engaged in the indentations 20. As shown in FIGS. 3, 4, and 5, tabs 50 of flat plate are rotatably mounted on opposite sides of lug body 25 by pin 51. Pin 51 is horizontally positioned and perpendicular to the lug body. When the tabs 50 are positioned as in FIG. 5 downward movement of lug body 25 is prevented because the tabs 50 rest on top of plate 18. Flat surface 52 on the bottom of tabs 50 restricts the tabs from rotating out of perpendicular position with respect to plate 18 and allowing lug body 25 to drop down. When tabs 50 are vertically positioned, teeth 35 are locked in indentations 20. To free the so locked lug body 35, tabs 50 need only be rotated to one side and the lug body be permitted to move downwardly until the teeth 35 are out of, and below, indentations 20. As shown in FIG. 4, rotation of tabs 52 to one side provides a clear path for placing a belt below shoulder portion 26.

FIG. 3 illustrates another feature of the invention which permits the floor of the vehicle to be freed of the lug body 25 and thereby unobstructed for placing a freight load to the very edge of the floor. As shown in phantom as 25A, the lug body can be swung over the outer end 17 and held suspended upside down by plate 15. The lug body can thus be stored in this way, when not needed for tiedown purposes, and the entire floor freed of obstructions.

I claim:

1. A tiedown device comprising:
   an elongated rigid fixedly secured plate, having a series of indentations in each side edge, horizontally mounted on a vertical web;
   a lug body slidably mounted on the plate topside and having a shoulder portion and a pair of arcuate arms downwardly and inwardly depending from the shoulder portion and terminating in rounded nose portions adapted to contact the underside of the plate close to the vertical web upon upward displacement of the lug with the remaining portion of the arms spaced away from the plate edges and underside of the plate;
   an upwardly extending tooth on each of the arms adapted to extend into an indentation in the plate edge when the nose portions contact the underside of the plate;
   the space between the shoulder and tooth being greater than the thickness of the plate, and the thickness of the arms is greater than the thickness of the tooth and the thickness of the indentations; and
   means on the lug body for attaching a tiedown strap or line.

2. A tiedown device according to claim 1 having locking means to hold the lug body in temporarily fixed position with the tooth engaged in an indentation in the plate, said locking means comprising a flat plate element rotatably mounted on the lug body by a pin horizontally positioned and perpendicular to the lug body to keep the shoulder displaced upwardly above the plate topside.

3. A tiedown device according to claim 2 in which the locking means element has a flat surface which contacts the plate topside surface when in locking position.

4. A tiedown device comprising:
   an elongated rigid fixedly secured plate, having a series of indentations in each side edge, horizontally mounted on a vertical web;
   a lug body slidably mounted on the plate topside and having a shoulder portion and a pair of arcuate arms downwardly and inwardly depending from the shoulder portion and terminating in rounded nose portions adapted to contact the underside of the plate close to the vertical web upon upward displacement of the lug with the remaining portion of the arms spaced away from the plate edges and underside of the plate;
   an upwardly extending tooth on each of the arms adapted to extend into an indentation in the plate when the nose portions contact the underside of the plate;
   the space between the shoulder and tooth being greater than the thickness of the plate, and the thickness of the arms is greater than the thickness of the tooth and the thickness of the indentations;
   each tooth having opposing flat parallel sides and a front face which joins the arm below the top of the nose portion; and
   means on the lug body for attaching a tiedown strap or line.

5. A tiedown device according to claim 4 in which each tooth is centrally located between the width of the arm.

6. A tiedown device according to claim 4 in which the sides of the tooth intersect the inner side of the arm in arcuate lines.

PO-1050
(5/69)

UNITED STATES PATENT OFFICE
CERTIFICATE OF CORRECTION

Patent No. 3,601,349           Dated August 24, 1971

Inventor(s)    James E. Murphy, Jr.

It is certified that error appears in the above-identified patent and that said Letters Patent are hereby corrected as shown below:

Col. 2, line 4, "side" should be --sides--. Col. 3, lines 8 and 35, "lug body 35" should be --lug body 25--.

Signed and sealed this 25th day of April 1972.

(SEAL)
Attest:

EDWARD M. FLETCHER, JR.        ROBERT GOTTSCHALK
Attesting Officer               Commissioner of Patents